(12) United States Patent
Johnston et al.

(10) Patent No.: US 8,346,060 B2
(45) Date of Patent: Jan. 1, 2013

(54) AUDIOVISUAL PRODUCTION AND EDITING SYSTEM AND METHOD

(75) Inventors: Carolyn Johnston, Dallas, TX (US); Michael Mooney, Decatur, AL (US)

(73) Assignee: ScreenFX Studios, LP, Dallas, TX (US)

( * ) Notice: Subject to any disclaimer, the term of this patent is extended or adjusted under 35 U.S.C. 154(b) by 327 days.

(21) Appl. No.: 12/722,359

(22) Filed: Mar. 11, 2010

(65) Prior Publication Data

US 2011/0222833 A1    Sep. 15, 2011

(51) Int. Cl.
*H04N 9/80* (2006.01)
*H04N 5/77* (2006.01)

(52) U.S. Cl. .................. 386/248; 386/224; 386/239

(58) Field of Classification Search .......... 396/200–234, 396/239–248, 278–290; 386/200–234, 239–248, 386/278–290
See application file for complete search history.

(56) References Cited

U.S. PATENT DOCUMENTS

| | | | | |
|---|---|---|---|---|
| 2,475,641 A | * | 7/1949 | Rosenberg | 348/722 |
| 5,721,586 A | * | 2/1998 | Shimamura et al. | 348/61 |
| 5,886,747 A | * | 3/1999 | Tzidon et al. | 348/587 |
| 2002/0180973 A1 | * | 12/2002 | MacKinnon et al. | 356/425 |

FOREIGN PATENT DOCUMENTS

WO    WO 2009/122356 A1 * 10/2009

* cited by examiner

*Primary Examiner* — Thai Tran
*Assistant Examiner* — Hung Dang
(74) *Attorney, Agent, or Firm* — Jackson Walker L.L.P.; Christopher J. Rourk

(57) ABSTRACT

A system for creating customized audiovisual content is provided. The system includes a location cue system for providing a plurality of synchronized location cues to direct a plurality of movement sequences for an actor. A speech cue system for providing a plurality of synchronized speech cues to direct a plurality of spoken sequences for the actor. A sequence controller for receiving location cue data and speech cue data and controlling the location cue system and the speech cue system.

20 Claims, 4 Drawing Sheets

AUDIOVISUAL PRODUCTION AND EDITING SYSTEM AND METHOD

FIELD OF THE INVENTION

The invention relates to audiovisual production, and more particularly to a system and method for audiovisual production and editing that allows primary production environment parameters such as lighting and camera settings that are used during creation of primary content to captured and reproduced to allow secondary content to be recorded and seamlessly inserted into the primary content.

BACKGROUND OF THE INVENTION

Production of audiovisual content such as movies and television shows is performed using a number of artistic entities. A director controls the sequence of activities as they are being recorded, such as the location of actors and the delivery of their lines. A lighting specialist controls the ambient and direct lighting, and a camera specialist controls camera settings and movements. A make-up artist controls the use of make-up on actors. Synchronization of all of these artistic entities has never been automated, and automation has not even been contemplated.

SUMMARY OF THE INVENTION

A system and method for audiovisual production and editing are provided that allows primary production environment parameters such as lighting and camera settings that are used during creation of primary content to be captured and reproduced. The primary production environment parameters can then be reproduced during the generation of secondary content, to allow the secondary content to be seamlessly inserted into the primary content, such as by using video editing techniques such as green screening.

DETAILED DESCRIPTION OF PREFERRED EMBODIMENTS

Figure 1:
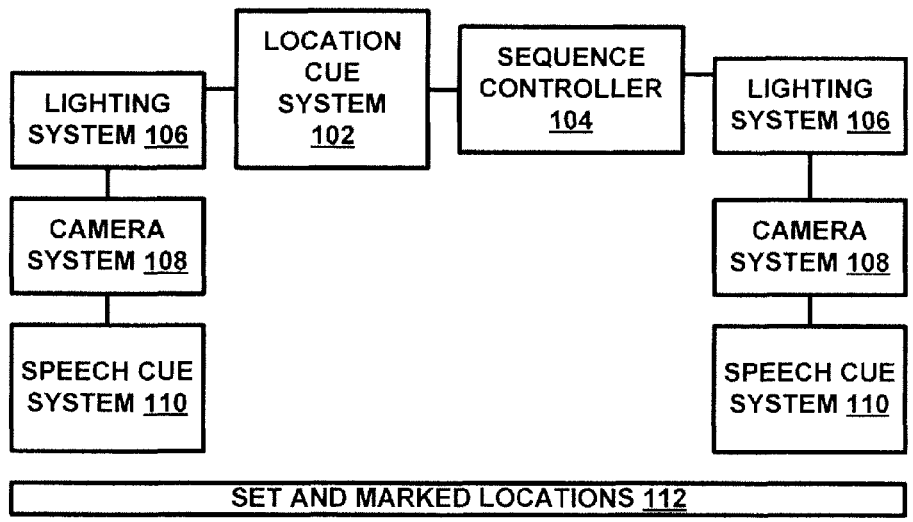
FIG. 1 is a diagram of a system for recording and producing audiovisual content in accordance with an exemplary embodiment of the present invention.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

FIG. 1 is a diagram of a system 100 for recording and producing audiovisual content in accordance with an exemplary embodiment of the present invention. System 100 allows a primary or master video production to be recorded with video production parameters so as to allow parties to recreate the video production parameters at a point in the future to record a secondary video production without the need for producing personnel, and to allow the secondary video production to be seamlessly merged with or inserted into the primary or master video production, such as by using green screen processes or other suitable editing and special effects processes.

System 100 includes sequence controller 104 and location cue system 102, each of which can be implemented in hardware or a suitable combination of hardware and software and which can be one or more software systems operating on a general or special purpose processing platform. As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications or on two or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 also includes lighting systems 106, camera systems 108, and speech cue systems 110, each of which can be implemented using associated lighting, camera or cue text display systems. In one exemplary embodiment, lighting systems 106 can be programmable controllable lighting for theme lighting, set lighting, ambient lighting, actor lighting or other suitable lighting systems. Lighting systems 106 can include one or more key lights, fill lights, back lights or other suitable lights, which can be arranged in predetermined configurations, sequenced or otherwise controlled to provide predetermined lighting effects. Lighting systems 106 can receive control data and can generate parameter definition data that can be stored and subsequently provided as parameter definition data to allow light settings to be "recorded" and "played back." Lighting systems 106 can also or alternatively be selected from one or more of the WDM ColorBar 19/39 from WDM Lighting of Dallas, Tex. and the Chauvet COLORdash or Q-Spot from Chauvet Lighting of Hollywood, Fla. Lighting systems 106 can also include user controls to allow a user to set a lighting level, direction or otherwise control the associated lights. The individual lights or groups of lights can be motorized or otherwise moveable by remote control.

Camera systems 108 can be one or more cameras that have controllable pan, zoom, tilt, or other suitable camera controllable characteristics. Camera systems 108 can receive control data and can generate parameter definition data that can be stored and subsequently provided as parameter definition data to allow camera settings to be "recorded" and "played back."

Speech cue systems 110 can be video displays, teleprompters or other devices that provide graphics and text for a user to read actor's lines. Lighting systems 106, camera systems 108 and speech cue systems 110 can each also be motorized or otherwise capable of being controlled in a movable manner and positioned based on stored positioning data, such as by mounting the individual components of lighting systems 106, camera systems 108 and speech cue systems 110 on a track and providing step motors or other suitable motive devices.

Location cue system 102 generates visible location cues on set and marked locations 112. In one exemplary embodiment, location cue system 102 can use lasers or other spot lighting systems to indicate where an actor should stand within set and marked locations 112. Set and marked locations 112 can also include marked locations that can be highlighted by lighting from location cue system 102, can include embedded lighting in addition to or in place of light beams from location cue system 102, or can otherwise provide suitable indications to a user to indicate where the user should stand or how the user should move.

Sequence controller 104 is used to control location cue system 102, lighting systems 106, camera systems 108, speech cue systems 110 and other suitable systems. In one exemplary embodiment, sequence controller 104 can record or provide time sequenced control data that allows a director or other production personnel to script or record the location of actors, lighting control data, camera control data, speech cue data or other suitable data that is used to control the actors and set parameters during content production. In this manner, the director or producer can create a record of the lighting levels and positions, camera settings and locations, and other suitable data during the recording of a primary audiovisual production, so as to allow those settings to be duplicated at a later time with a third party actor to record a secondary audiovisual production that can be inserted or edited into the primary audiovisual production at a later point in time. In one exemplary embodiment, sequence controller 104 can be implemented using the MagicQ product line controllers available from Chamsys Ltd. of Southampton, United Kingdom, or any other suitable systems.

Set and marked locations 112 can include a set that has props and marked locations on a floor or otherwise marked indicators that are used to direct actors. In one exemplary embodiment, actors can be directed during the creation of a primary audiovisual production, and set and marked locations 112 can be used to record locations and provide markings or other set indications for use during the creation of a secondary audiovisual production. During the secondary audiovisual production, set and marked locations 112 can be used to indicate to an actor where to stand, where to move, how to move, or to provide other suitable directions based on lighting indications on set and marked locations 112, such as in combination with location cue system 102 or in other suitable manners. For example, an actor can be directed during the production of a secondary audiovisual recording to move from one location to a second location using location cue system 102, embedded lights in set and marked locations 112, or in other suitable manners so as to allow the actor to read from a first speech cue system 110 at a first location and then to move to a second location to read from a second speech cue system 110 without any director involvement and in synchronization with the primary audiovisual recording.

In operation, system 100 allows a director, producer, or other suitable personnel to record lighting settings, camera settings, locations of actors and other suitable data during the creation of a primary audiovisual recording so as to allow those parameters to be recreated during the production of a secondary audiovisual recording, so that actors can be inserted into primary audiovisual recording recorded content, such as using green screen processing or other suitable editing, special effects or other video processing. Likewise, system 100 provides a set for reproducing the environment in which an actor should recite lines or otherwise be recorded in a secondary audiovisual production so as to allow that content to be inserted into previously recorded and edited material. In this manner, actors can be used to create a "backdrop" audio visual content production, which can then be edited and modified as necessary to add special effects, scenes, background images or other suitable video or audio effects. The recording can then be used in a retail location, an online application or in other suitable locations to allow actors to be inserted into a professional production. In this manner, non-professional actors can be provided with a professionally produced background production in an economical manner.

Figure 2:
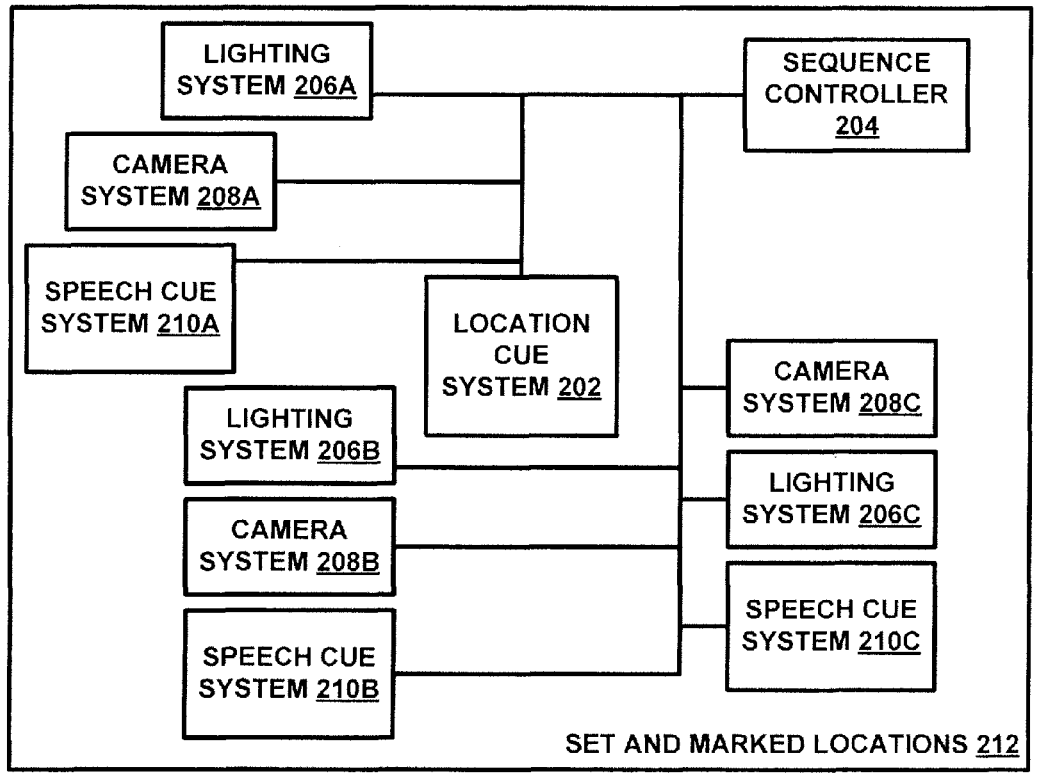
FIG. 2 is a diagram of a system for recording and playing back production parameters in accordance with an exemplary embodiment of the present invention.

FIG. 2 is a diagram of a system 200 for recording and playing back production parameters in accordance with an exemplary embodiment of the present invention. System 200 includes location cue system 202, sequence controller 204, lighting systems 206A through 206C, camera system 208A through 208C, and speech cue systems 210A through 210C. The arrangement of the lighting systems, camera systems, and speech cue systems is varied in different locations, such as to assist an actor with facing in a predetermined angle with respect to a camera, light, or other suitable set elements. In this manner, a director can control the position and movements of an actor so as to allow an actor to be inserted into prerecorded programming. For example, lighting system 206A is shown displaced relative to camera system 208A, which is displaced relative to speech cue system 210A, such that an actor facing speech cue system 210A would be recorded by camera system 208A from a plurality of views, and would also be partially in shadows from lighting system 206A. Other exemplary configurations are also shown, but the placement of lighting systems, camera systems and speech cue systems can be controlled to not only control the location of an actor on set and marked locations 212 but to also control the aspect of the actor with respect to cameras and lighting elements, so as to eliminate the need for live producers, directors and other set personnel during the recording of a secondary audiovisual production.

Figure 3:
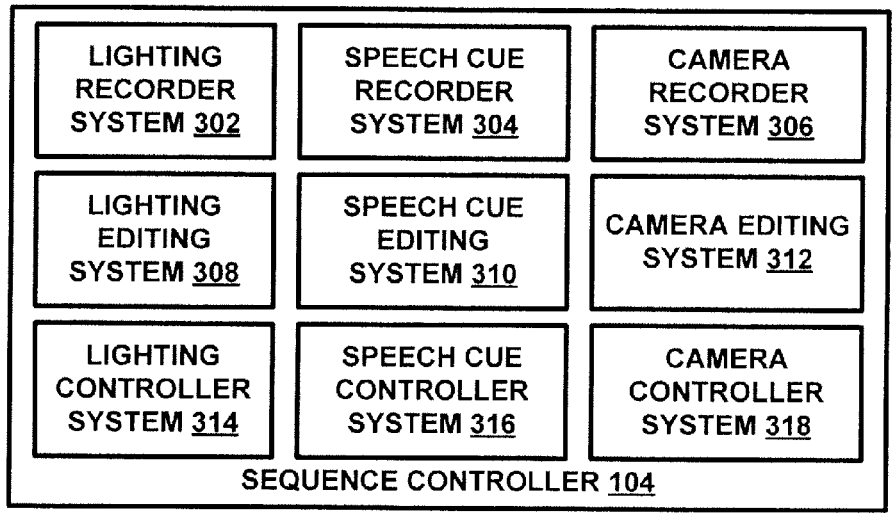
FIG. 3 is a diagram of a system for providing sequence control and recording in accordance with an exemplary embodiment of the present invention.

FIG. 3 is a diagram of a system 300 for providing sequence control and recording in accordance with an exemplary embodiment of the present invention. System 300 can be implemented in hardware or a suitable combination of hardware and software, and can be one or more software systems operating on a general purpose processing platform.

System 300 includes sequence controller 104 and lighting recorder system 302, speech cue recorder system 304, camera recorder system 306, lighting editing system 308, speech cue editing system 310, camera editing system 312, lighting controller system 314, speech cue controller system 316, and camera controller system 318, each of which can be implemented in hardware or a suitable combination of hardware and software, and which can be one or more software systems operating on a general purpose processing platform.

Lighting recorder system 302 records lighting settings for lighting devices that are used in a studio or set. In one exemplary embodiment, a studio or set can use dozens of lights, including ambient lighting, set lighting, character lighting, or other suitable lights, where each light can be individually controlled, controlled as part of a bank or group of lights, positioned manually or using motor controls, or otherwise controlled to provide desired lighting characteristics. Lighting recorder system 302 records the current settings of lighting, such as those that are manually set by a lighting engineer, so as to allow the lighting parameters to be captured in real time, such as during the recording of primary audiovisual content, and then to be "played back" as required during the recording of secondary audiovisual content.

Speech cue recorder system 304 allows a producer, director, or other suitable persons to select speech cue recorder locations, such as to identify a direction in which an actor is looking or should be looking during recording of a production. In one exemplary embodiment, speech cue recorder system 304 can be associated with dummy displays that are on set during the creation of primary audiovisual content, where the dummy displays are numbered and placed in locations that will have live speech cue displays on the set during the creation of the secondary audiovisual content. In this exemplary embodiment, the director can select the number of a display based on the direction in which an actor is looking, so as to create synchronized directional cues.

Camera recorder system 306 records the direction, settings, tilt, pan, zoom, or other parameters for each camera on a set during the creation of the primary audiovisual content, so as to allow the camera settings to be produced during subsequent production of and recording of different actors during the creation of the secondary audiovisual content. In one exemplary embodiment, the cameras that are used on set during the creation of the primary audiovisual content can be manually controlled, and the settings/parameters can be recorded and synchronized with the primary audiovisual content to allow the camera settings to be "played back" during the creation of secondary audiovisual content, such as when a single actor is being recorded to be edited/inserted into the primary audiovisual content.

Lighting editing system 308 allows a user to edit lighting parameter data stored for lighting recorder system 302 or to create a sequence of lighting parameters for use by lighting controller system 314. In one exemplary embodiment, an editor or post production manager may observe lighting discontinuities or incongruities in primary audiovisual content and may correct such lighting problems using lighting editing system 308, such as in order to re-record one or more scenes in the primary audiovisual content. In other exemplary embodiment, a producer, director or other personnel can produce lighting parameter sequences in advance of creation of the primary audiovisual content using live actors, such as to help plan a scene, to reduce the number of lighting control personnel that are required, or to otherwise assist with directing lighting.

Speech cue editing system 310 allows a director, a producer or other suitable users to edit speech cues, such as by changing the location of a speech cue system that an actor should be faced towards, to create new content or in other suitable manners. In one exemplary embodiment, the user can edit the content to match predetermined content, such as to include the name of an actor that will be featured in the secondary audiovisual content, to include the name of the city in which the secondary audiovisual content is being recorded, or for other suitable purposes. In another exemplary embodiment, the script for primary audiovisual content can be modified or customized by a user, such as for humorous purposes.

Camera editing system 312 allows a director, post production manager or other users to change camera settings, such as to modify the camera setting to correct problems with primary or secondary audiovisual content, or in other suitable manners. In one exemplary embodiment, a director may observe that actors are obscured or are facing in a wrong direction, and can change the active camera for a scene to correct that problem during the creation of secondary audiovisual content.

Lighting controller system 314 receives lighting parameter data and controls lighting components to reproduce the lighting parameters that were used during the creation of primary audiovisual content. In one exemplary embodiment, lighting controller system 314 can receive lighting parameters/settings that were captured during recording of primary audiovisual content and can "play back" those lighting parameters/settings so as to allow secondary audiovisual content to be created and edited/inserted into the primary audiovisual content.

Speech cue controller system 316 generates synchronized text or other readable speech cues to allow actors to be recorded in secondary audiovisual content that is to be edited and included in primary audiovisual content. The text/speech cues are synchronized to the primary audiovisual content to allow the secondary audiovisual content to be edited or inserted into the primary audiovisual content so as to provide a seamless overlap that simulates a primary audiovisual content that was made using the secondary audiovisual content.

Camera controller system 318 receives camera control parameters or data and controls cameras in a plurality of locations around a set/scene so as to record secondary audiovisual content using a plurality of actors. The secondary audiovisual content can then be inserted or edited into primary audiovisual content, to allow individuals to be "inserted" into prerecorded primary audiovisual content of interest.

In operation, system 300 allows the lighting, camera, speech cues, or other suitable controls or parameters of a production to be recorded, edited, planned, and "played back" so as to allow primary audiovisual content to be recorded, including all of operational parameters. Those operational parameters are then played back during recording of secondary audiovisual content, and the secondary audiovisual content can be edited into the primary audiovisual content so as to allow an actor who is not present during the creation of the primary audiovisual content to be inserted into that content.

Figure 4:
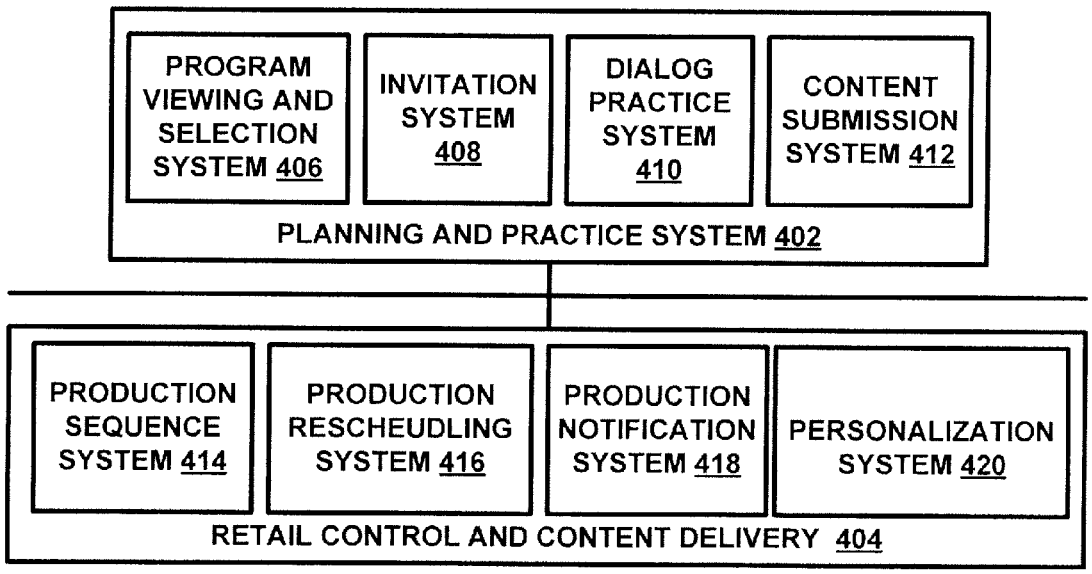
FIG. 4 is a diagram of a system for scheduling events in a retail location using layered audiovisual processing in accordance with an exemplary embodiment of the present invention.

FIG. 4 is a diagram of a system 400 for scheduling events in a retail location using layered audiovisual processing in accordance with an exemplary embodiment of the present invention. System 400 includes planning and practice system 402, retail control and content delivery system 404, and associated sub-systems, each of which can be implemented in hardware or a suitable combination of hardware and software and which can be one or more software systems operating on a general purpose processing platform.

Planning and practice system 402 includes program viewing and selection system 406, invitation system 408, dialogue practice system 410 and content submission system 412. Program viewing and selection system 406 allows the user to select an existing recorded program that they wish to act out and be included in as a primary subject actor, such as primary video content that will be edited after the recording of secondary video content to include the user or other persons. In one exemplary embodiment, program viewing and selection system 406 can allow a user to identify a character that they wish to play, a scene or set of scenes involving the character, or other suitable programs. The user can then view the program selection and make a decision whether or not to keep the selection or to choose another program.

Invitation system 408 allows a user to plan an event where a number of attendees will be provided with the opportunity to record secondary audiovisual content that will be edited/inserted into selected primary audiovisual content. In one exemplary embodiment, invitation system 408 can allow a user to identify available times and costs for recording content with attendees, to list persons to be invited, or perform other suitable functions. In one exemplary embodiment, invitation system 408 can send out invitations, can receive confirmations, can allow invitees to select content using program viewing and selection system 406 and can perform other suitable processes.

Dialogue practice system 410 allows a user to practice dialogue for a selected program. In one exemplary embodiment, dialogue practice system 410 can generate visual cues, text, or other suitable materials to allow the user to practice the dialogue they will be reciting during an actual production. Dialogue practice system 410 can also allow a user to record audio content for insertion into audio content for primary audiovisual content, such as to allow the user to hear how they will sound in the primary audiovisual content after it is edited to include secondary audiovisual content.

Content submission system 412 allows users to submit ideas for programming. In one exemplary embodiment, content submission system 412 can allow users to identify scenes or other programs that can be used with the content, including but not limited to voice-over content for existing primary audiovisual content or content for use with other suitable editing techniques, such as video editing.

Retail control and content delivery system 404 includes production sequence system 414, production rescheduling system 416, production notification system 418 and personalization system 420. Production sequence system 414 allows productions to be sequenced to accommodate a large number of actors and the creation of a large number of secondary audiovisual content recordings and the subsequent editing of associated primary audiovisual content to create personalized primary audiovisual content. In one exemplary embodiment, production sequence system 414 can schedule actors in different rooms for different sets so as to optimize the flow of actors in a finite number of sets and over a finite period of time. Production sequence system 414 interfaces with invitation system 408 and program viewing and selection system 406 to create preliminary schedules, arrange for props, wigs, stage makeup and costumes, and to otherwise coordinate daily and hourly logistics.

Production rescheduling system 416 allows a user to reschedule production schedules based on minor changes, such as the unavailability of an actor or actors for various sequences at a predetermined time. In one exemplary embodiment, actors can be requested to appear in a waiting area prior to a certain point in time and upon failure to appear the actors can be rescheduled. Likewise, actors can be given machine-readable tags or other suitable devices and information associated with the tags or devices can be used to assist the scheduling, such as by reading the tag data to retrieve a costume, wig, props or other suitable items, by modifying the schedule based on the time the tag data is read at a production staging area, or in other suitable manners.

Production notification system 418 allows users to be notified of production milestones or deadlines. In one exemplary embodiment, a user that has been selected to record secondary audiovisual content at a predetermined time can be notified to appear at a certain place, such as a staging area, if that user has not yet arrived. Likewise, the user can be notified that their production is ready for viewing or editing.

Personalization system 420 receives predetermined inputs, user selected inputs or other suitable inputs from video content and creates personalized media, merchandise and other materials. In one exemplary embodiment, the primary audiovisual content and the secondary audiovisual content are processed by personalization system 420 to generate personalized, customized audiovisual content. In this exemplary embodiment, the primary audiovisual content can be synchronized with tags or other data to allow the secondary audiovisual content to be edited into the primary audiovisual content using video editing techniques such as green screen techniques. A user can also select scenes from the customized audiovisual content such as for personal computer mouse pads, screen savers, movie posters or any other novelty souvenir item or other movie memorabilia that simulates paraphernalia used in movie productions.

In operation, system 400 allows users to plan events around a facility that has recording studios for recording short feature video content. System 400 also allows parties or other events to be planned, personnel to be invited, and props, wigs, stage make-up and costumes to be prepared and scheduled so as to allow different parties, persons, or attendees to select different programs, to practice such programs, and to efficiently move large numbers of personnel through the production set.

Figure 5:
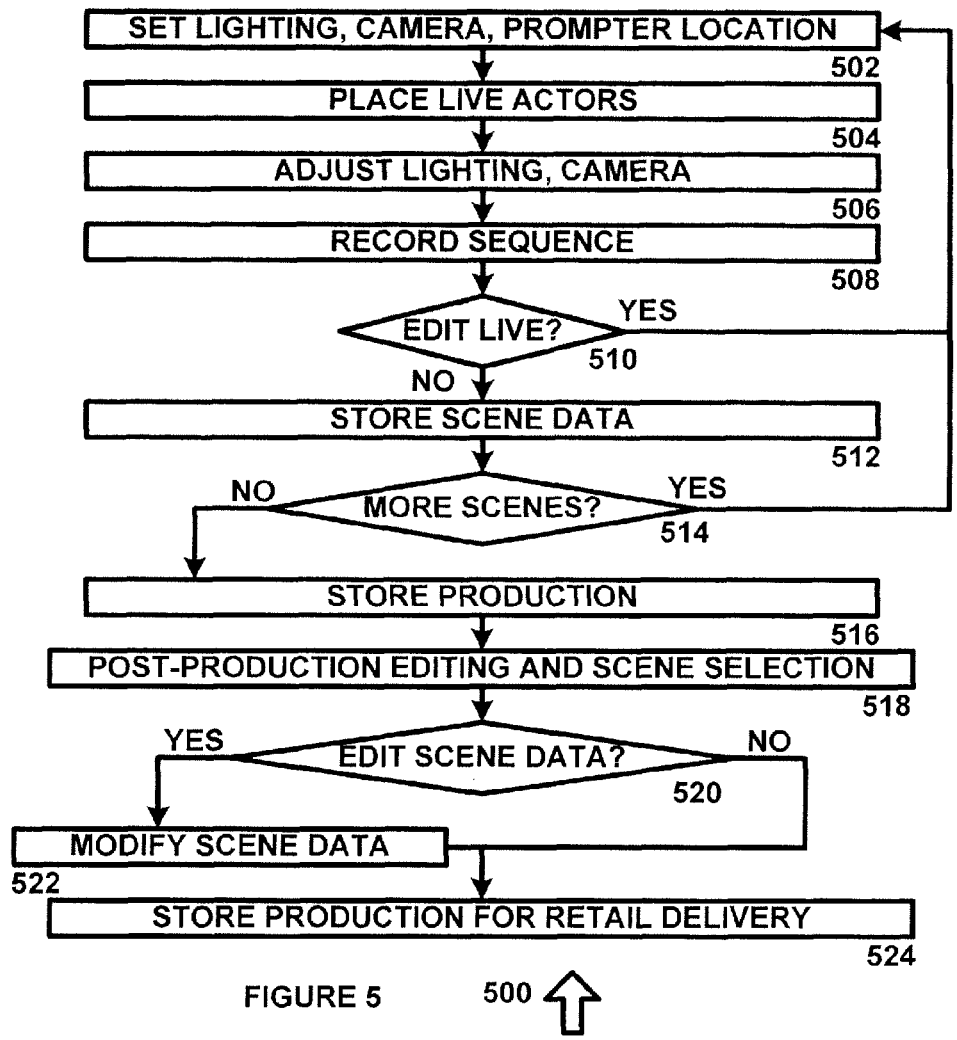
FIG. 5 is a flow chart of a method for recording and editing production data in accordance with an exemplary embodiment of the present invention.

FIG. 5 is a flow chart of a method 500 for recording and editing production data in accordance with an exemplary embodiment of the present invention. Method 500 can be implemented as an algorithm on a general purpose processing platform, such as by utilizing the exemplary pseudo code or in other suitable manners.

Method 500 begins at 502 where set lighting, camera and prompter parameter data is stored. In one exemplary embodiment, the set lighting, camera, and prompter location data can be generated on a set, can be stored prior to being used on the set, can be stored and modified after use or can otherwise be stored. Exemplary pseudo code for 502 can include:

10 read and store lighting parameter data
    20 read and store camera parameter data
    30 read and store prompter parameter data
The method then proceeds to 504.

At 504, live actors are placed on the scene. In one exemplary embodiment, the live actors can be given predetermined directions, lighting cues can be generated, or other suitable placement tools can be used. Exemplary pseudo code for 504 can include:

40 receive and store lighting cue data
The method then proceeds to 506.

At 506 the lighting and the camera systems are adjusted to reflect the actual set conditions, the actors' orientations, or other suitable factors. Adjustment of lighting and camera is usually performed manually by personnel, but automated processes can also or alternatively be used where suitable. The method then proceeds to 508.

At 508 the sequence data is recorded, such as changes in lighting or camera during live actor movements, changes in prompter locations, or other suitable changes. The sequence data is synchronized to the recorded primary audiovisual content, so as to allow secondary audiovisual content to be created that can be edited into the primary audiovisual content. Exemplary pseudo code for 508 can include:

50 read and store changes in parameter data, synchronize
The method then proceeds to 510.

At 510 it is determined whether there are edits required for the primary audiovisual content. For example, several takes of the live production can be created, so as to provide a director or other personnel with alternative scenes that can be used to correct mistakes or otherwise improve quality. Depending on the take that is selected, the parameter data may need to be edited and synchronized. If it is determined that no editing is required the method proceeds to 512 otherwise the method returns to 502. Exemplary pseudo code for 510 can include:

60 if scene selection change, match parameters from new scene and synchronize

At 512 scene data is stored, such as after all editing has been created. Exemplary pseudo code for 512 can include:

70 store parameter data for primary audiovisual content

The method then proceeds to 514.

At 514 it is determined whether there are more scenes to be recorded. In one exemplary embodiment, primary audiovisual content can include a number of scene or set changes, where the production of each scene can include a plurality of takes. If it is determined that there are no more scenes the method proceeds to 516 otherwise the method returns to 502.

At 516 the production sequence is stored. The method then proceeds to 518 where post production editing and scene selection is performed. In one exemplary embodiment, when a plurality of scenes are recorded, the optimal scene take may be selected at a later time. Likewise, lighting adjustments, camera adjustments or other suitable adjustments can be made to the stored parameters, such as to improve the correlation between the primary audiovisual content and the secondary audiovisual content, to re-record primary audiovisual content, or for other suitable purposes. The method then proceeds to 520.

At 520 it is determined whether to edit scene data. In one exemplary embodiment, where it is determined from post production editing and scene selection that some edits are required, such as to improve continuity between scenes, the edits can be generated at 522 such as by editing or modifying the set lighting parameters, camera parameters, prompter data or other suitable data. Otherwise, if not editing is required, the method proceeds to 524.

At 524 the production is stored for retail delivery. In one exemplary embodiment, retail delivery can occur at a number of retail locations having a large number of sets that can be used by parties or in other suitable applications, where each set contains a predetermined configuration of lighting systems, camera systems, prompter systems, props, and other suitable items. The production can be delivered as the sequenced control data and parameters to allow the secondary audiovisual content to be created, the produced primary audiovisual content, special effects data, controls for editing or merging the primary audiovisual content with the secondary audiovisual content, and other suitable data.

In operation method 500 allows primary audiovisual content to be recorded and for lighting, camera, prompter angles or other suitable data and parameters to be recorded so that the primary video production can be used as a backdrop and overlaid with a secondary video production using a single actor or groups of actors at a later date. In this manner, post production of primary audiovisual content to include individuals and to allow the primary audiovisual content to be customized and personalized can be accomplished in a franchise environment, so as to allow users to obtain customized audiovisual content that has the appearance of professionally produced audiovisual content.

Figure 6:
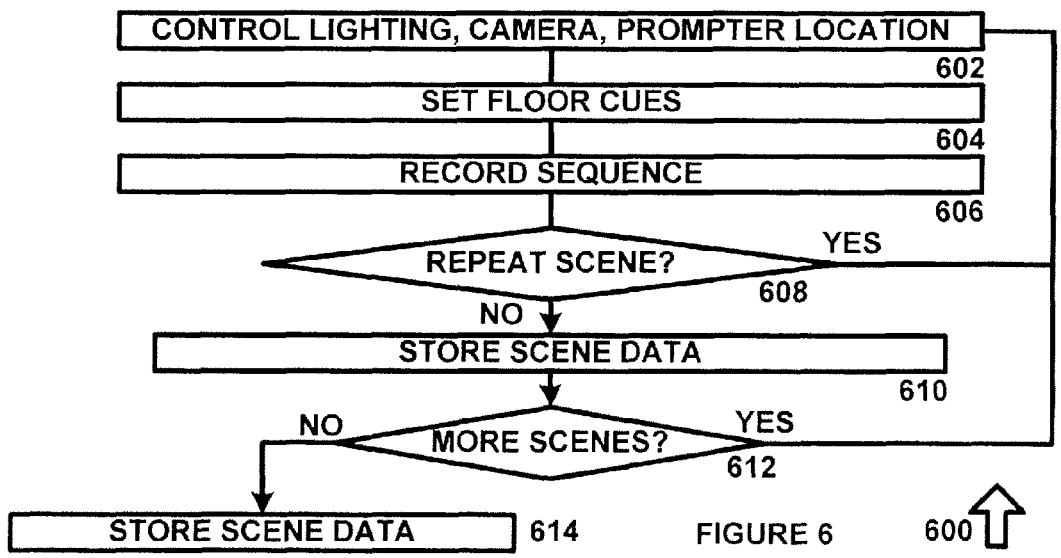
FIG. 6 is a flow chart of a method for recording secondary audiovisual content in accordance with an exemplary embodiment of the present invention.

FIG. 6 is a flow chart of a method 600 for recording secondary audiovisual content in accordance with an exemplary embodiment of the present invention. Method 600 can be implemented as algorithms operating on a general purpose processing platform or in other suitable manners.

Method 600 begins at 602 where lighting, camera, and prompter location, control and other parameter settings are generated. In one exemplary embodiment, 602 can be implemented as an algorithm where the control lighting, camera, and prompter location data is generated and provided to controllers that control the location, intensity or other features of lighting, the pan, tilt, location or other features of cameras, and an active prompter or text or other suitable data for a prompter. In another exemplary embodiment, the lighting, camera, prompter location or other suitable data devices can be on tracks so as to be movable to provide greater flexibility and set design. Exemplary pseudo code for 602 can include:

10 read lighting parameters, generate controls
20 read camera parameters, generate controls
30 read prompter parameters, generate controls The method then proceeds to 604.

At 604, floor cues are set. In one exemplary embodiment, floor cues can include a sequence of lighting indicators that are generated on the floor by overhead lasers or other lighting fixtures, sequencing of LED displays that are set into a floor of the set, or other suitable indicators that are used to direct an actor to appropriate and predetermined locations. Exemplary pseudo code for 604 can include:

40 read and set floor cues

The method then proceeds to 606.

At 606 a sequence recording is made. In one exemplary embodiment, the actor can be led by floor cues to different locations, and can read from prompters at each location while lighting and camera parameters/settings are used to record the actor using predetermined settings that have been recorded for live personnel during a live production, where all parameters/settings are synchronized so as to allow the secondary audiovisual content to be recorded without the need for directors, producers, camera operators, lighting operators or other personnel. Exemplary pseudo code for 606 can include:

50 execute lighting, prompter, camera and floor cues in sequence

The method then proceeds to 608.

At 608 it is determined whether or not it is necessary to repeat the scene, such as to create a number of takes for editing, to play back the scenes until the actor is satisfied with the take, or to otherwise repeat the scene. If it is determined at 608 to repeat the scene the method returns to 602, otherwise the method proceeds to 610.

At 610 the scene is stored, such as by storing the entire recording from each camera, storing a sequence of recordings from various cameras in a predetermined order, or in other suitable manners. The method then proceeds to 612.

At 612 it is determined whether additional scenes should be recorded for a production. In one exemplary embodiment, a production can include a number of scenes and lighting modifications, camera location modifications, prompter location modifications, set changes or other suitable changes may be required based on the scene. If it is determined that there are more scenes the method returns to 602, otherwise the method proceeds to 614 where the scene data is stored for post production processing and content delivery.

In operation, method 600 allows parameters/settings for lighting, camera, prompters, and other suitable data for a production set to be controlled in a repeatable manner. Method 600 allows an actor to be recorded in secondary audiovisual content, which can then be edited/inserted into primary audiovisual content. In one exemplary embodiment, the primary audiovisual content can be recorded using green screen techniques, and special effects, backgrounds and other imaging can be added after recording is completed. Method 600 can then be used to record secondary audiovisual content that features a single actor, a group of actors, or other suitable personnel so as to allow that secondary audiovisual content to be edited/inserted into the primary audiovisual content. Method 600 allows lighting, camera, or other suitable parameters to be controlled so as to allow the secondary audiovisual content to be recorded and edited/inserted into primary audiovisual content in an entirely automated process. In this manner, the cost is reduced and repeatability is provided for creating customized, personalized recordings, such that it becomes feasible to use method 600 for events such as birthday parties or other special occasions to allow participants to select and obtain the personalized recordings during the course of a relatively short duration social setting.

Figure 7:
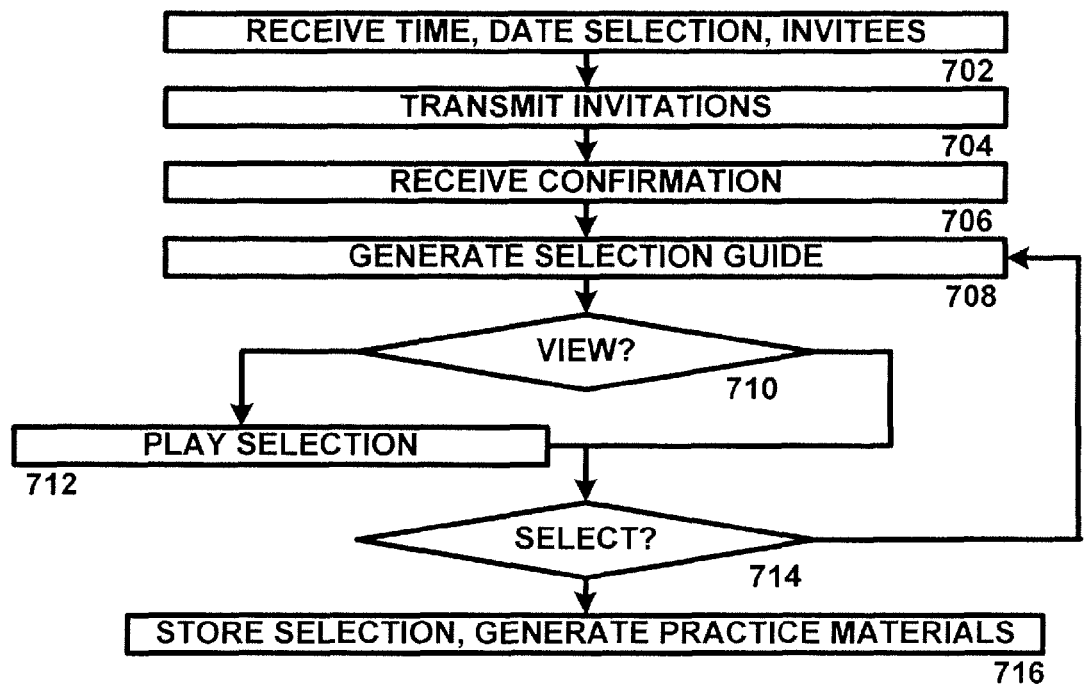
FIG. 7 is a flow chart of a method for scheduling and executing events in accordance with an exemplary embodiment of present invention.
Figure 7:

FIG. 7 is a flow chart of a method 700 for scheduling and executing events in accordance with an exemplary embodiment of present invention. Method 700 can be implemented as one or more algorithms operating on a general purpose processor or processors.

Method 700 begins at 702 where a time and date selection is received for an event, such as by generating and displaying a calendar of available times and dates and allowing the user to select available times and dates. In addition, costs associated with times can be generated such as to assess a premium for events scheduled during high demand periods, to create an incentive to plan events at times of low demand, or to otherwise control scheduling of events. Likewise, invitees can be identified, such as using user entry of invitee names and addresses or other suitable processes. The method then proceeds to 704.

At 704 invitations are transmitted to invitees, such as by identifying the time, the date, and other suitable event parameters. In this exemplary embodiment, the invitations can include a video invitation that is set to match the theme of the event, that is selected based on known interests of the invitees or other suitable manner. The method then proceeds to 706.

At 706 confirmation is received from the invitee, such as by receiving a confirmation email or in other suitable manners. Confirmation can also include additional prepaying of optional features, such as a movie poster, a number of recordings of the event that are to be mailed to predetermined addressees, or other suitable confirmations. The method then proceeds to 708.

At 708 a selection guide is generated. In one exemplary embodiment, an invitee can select from categories of programs and review programs in each category to make a selection of the primary audiovisual content that they wish to have customized. The method then proceeds to 710 where it is determined whether the invitee wishes to view the selected program. If the invitee does not wish to view the program, the method proceeds to 714, otherwise the method proceeds to 712 where the selection is played for the invitee. The method then proceeds to 714 where it is determined whether a selection has been made.

If a selection has been made at 714, the method proceeds to 716, otherwise the method returns to 708 where the invitee can review the selection guide again. At 716, the selection is stored and practice materials are generated for the invitee, such as script text, MP3 or audio visual recordings from other suitable practice materials to allow the invitee to practice their part or role in a production prior to attending the event.

In operation method 700 allows a user to schedule an event, invite attendees, and allow the invitees to select audiovisual programs that they can interact with. Interaction with the audiovisual programming is provided by allowing the user to view a primary audiovisual content recording which has one or more preselected replacement roles, where the user can select a role to replace the person in the primary audiovisual content. Using the system and method as disclosed herein, the user can record secondary audiovisual content that is to be edited into the primary audiovisual content, so as to create seamless, customized audiovisual content showing the user in a production. Method 700 can also or alternatively be used with suitable audiovisual content, such as classic or popular movies, so as to allow users to be inserted into those movies, to simulate acting in various scenes, or for other suitable purposes.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A method for creating customized audiovisual content comprising:
    storing a plurality of parameters for a camera system at a first location during recording of primary audiovisual content;
    storing a plurality of parameters for a lighting system at the first location during recording of the primary audiovisual content;
    storing a plurality of parameters for a speech cue system at the first location during recording of the primary audiovisual content;
    synchronizing the plurality of parameters for the camera system, the lighting system and the speech cue system;
    storing the synchronized parameters in a sequence controller;
    controlling a camera system at a second location with the sequence controller using the synchronized parameters;
    controlling a lighting system at the second location with the sequence controller using the synchronized parameters;
    controlling a speech cue system at the second location with the sequence controller using the synchronized parameters;
    controlling a location cue system at the second location with the sequence controller using the synchronized parameters to direct a location of an actor; and
    recording secondary audiovisual content including the actor.

2. The method of claim 1 further comprising editing the primary audiovisual content to insert the secondary audiovisual content.

3. The method of claim 1 wherein storing the plurality of parameters for the camera system at the first location during recording of the primary audiovisual content comprises storing one or more of camera pan data, camera zoom data and camera tilt data.

4. The method of claim 1 wherein storing the plurality of parameters for the lighting system at the first location during recording of the primary audiovisual content comprises storing one or more of key light activation data, fill light activation data, back light activation data, lighting level data and lighting direction data.

5. The method of claim 1 wherein storing the plurality of parameters for the speech cue system at the first location during recording of the primary audiovisual content comprises storing one or more of text data, graphics data, text position data and graphics position data.

6. The method of claim 1 wherein synchronizing the plurality of parameters for the camera system, the lighting system and the speech cue system comprises associating at least one camera with at least one lighting setting and at least one speech cue.

7. The method of claim 1 wherein controlling the camera system at the second location with the sequence controller using the synchronized parameters comprises controlling one or more camera using one or more of camera pan data, camera zoom data and camera tilt data.

8. The method of claim 1 wherein controlling the lighting system at the second location with the sequence controller using the synchronized parameters comprises controlling one or more light key using one or more of light activation data, fill light activation data, back light activation data, lighting level data and lighting direction data.

9. The method of claim 1 wherein controlling the speech cue system at the second location with the sequence controller using the synchronized parameters comprises generating one or more displays using one or more of text data, graphics data, text position data and graphics position data.

10. The method of claim 1 wherein controlling the location cue system at the second location with the sequence controller using the synchronized parameters to direct the location of an actor comprises controlling one or more embedded lighting elements.

11. The method of claim 1 wherein controlling the location cue system at the second location with the sequence controller using the synchronized parameters to direct the location of an actor comprises controlling one or more light beam locations.

12. A method for creating customized audiovisual content comprising:
   storing a plurality of parameters for a camera system at a first location during recording of primary audiovisual content;
   storing a plurality of parameters for a lighting system at the first location during recording of the primary audiovisual content;
   storing a plurality of parameters for a speech cue system at the first location during recording of the primary audiovisual content;
   storing a plurality of parameters for a location cue system at the first location during recording of the primary audiovisual content;
   synchronizing the plurality of parameters for the camera system, the lighting system, the location cue system and the speech cue system;
   storing the synchronized parameters in a sequence controller;
   controlling a camera system at a second location with the sequence controller using the synchronized parameters;
   controlling a lighting system at the second location with the sequence controller using the synchronized parameters;
   controlling a speech cue system at the second location with the sequence controller using the synchronized parameters;
   controlling a location cue system at the second location with the sequence controller using the synchronized parameters to direct a location of an actor; and
   recording secondary audiovisual content including the actor.

13. The method of claim 12 further comprising editing one or more of the parameters for the camera system, the lighting system, the speech cue system and the location cue system prior to synchronizing the plurality of parameters for the camera system, the lighting system, the location cue system and the speech cue system.

14. The method of claim 12 wherein storing the plurality of parameters for the camera system at the first location during recording of the primary audiovisual content comprises storing one or more of camera pan data, camera zoom data and camera tilt data.

15. The method of claim 12 wherein storing the plurality of parameters for the lighting system at the first location during recording of the primary audiovisual content comprises storing one or more of key light activation data, fill light activation data, back light activation data, lighting level data and lighting direction data.

16. The method of claim 12 wherein storing the plurality of parameters for the speech cue system at the first location during recording of the primary audiovisual content comprises storing one or more of text data, graphics data, text position data and graphics position data.

17. The method of claim 12 wherein synchronizing the plurality of parameters for the camera system, the lighting system and the speech cue system comprises associating at least one camera with at least one lighting setting, at least one location cue and at least one speech cue.

18. A method for creating customized audiovisual content comprising:
   storing a plurality of parameters for a camera system at a first location during recording of primary audiovisual content;
   storing a plurality of parameters for a lighting system at the first location during recording of the primary audiovisual content;
   storing a plurality of parameters for a speech cue system at the first location during recording of the primary audiovisual content;
   editing at least one of the plurality of parameters for the camera system, the lighting system and the speech cue system;
   synchronizing the plurality of parameters for the camera system, the lighting system and the speech cue system;
   storing the synchronized parameters in a sequence controller;
   controlling a camera system at a second location with the sequence controller using the synchronized parameters;
   controlling a lighting system at the second location with the sequence controller using the synchronized parameters;
   controlling a speech cue system at the second location with the sequence controller using the synchronized parameters;
   controlling a location cue system at the second location with the sequence controller using the synchronized parameters to direct a location of an actor; and
   recording secondary audiovisual content including the actor.

19. The method of claim 18 wherein storing the plurality of parameters for the camera system at the first location during recording of the primary audiovisual content comprises storing one or more of camera pan data, camera zoom data and camera tilt data.

20. The method of claim 18 wherein storing the plurality of parameters for the lighting system at the first location during recording of the primary audiovisual content comprises storing one or more of key light activation data, fill light activation data, back light activation data, lighting level data and lighting direction data.

* * * * *